United States Patent [19]

Geiger

[11] 4,347,055
[45] Aug. 31, 1982

[54] SIMULATOR STRUCTURE

[75] Inventor: Robert J. Geiger, Kirkwood, N.Y.

[73] Assignee: The Singer Company, Binghamton, N.Y.

[21] Appl. No.: 165,178

[22] Filed: Jul. 2, 1980

[51] Int. Cl.³ .............................................. G09B 9/08
[52] U.S. Cl. .................................................... 434/30
[58] Field of Search ........................ 434/29, 30, 51, 55

[56] References Cited

PUBLICATIONS

Navigational Trainer Mark IV Operation Manual and Parts Catalog, Jan. 1944, cover, title page, pp. 2-5.

*Primary Examiner*—William H. Grieb
*Attorney, Agent, or Firm*—Jeff Rothenberg; Douglas M. Clarkson

[57] ABSTRACT

The specification describes a structure for a vehicle simulator in which realism is maximized. For a simulator in which a trainee can see out, the outer surface is contoured to match the contour of the vehicle being simulated only over that surface which is seen from the trainee's seat. To accomplish this, a first pair of sills are supported above a base surface by a first plurality of ribs, and a second pair of sills are supported above the first pair of sills by a second plurality of ribs. The length of the second ribs space the second sills above the first sills by a distance pre-calculated to cover only the portion of the vehicle that is visible to the trainee.

2 Claims, 16 Drawing Figures

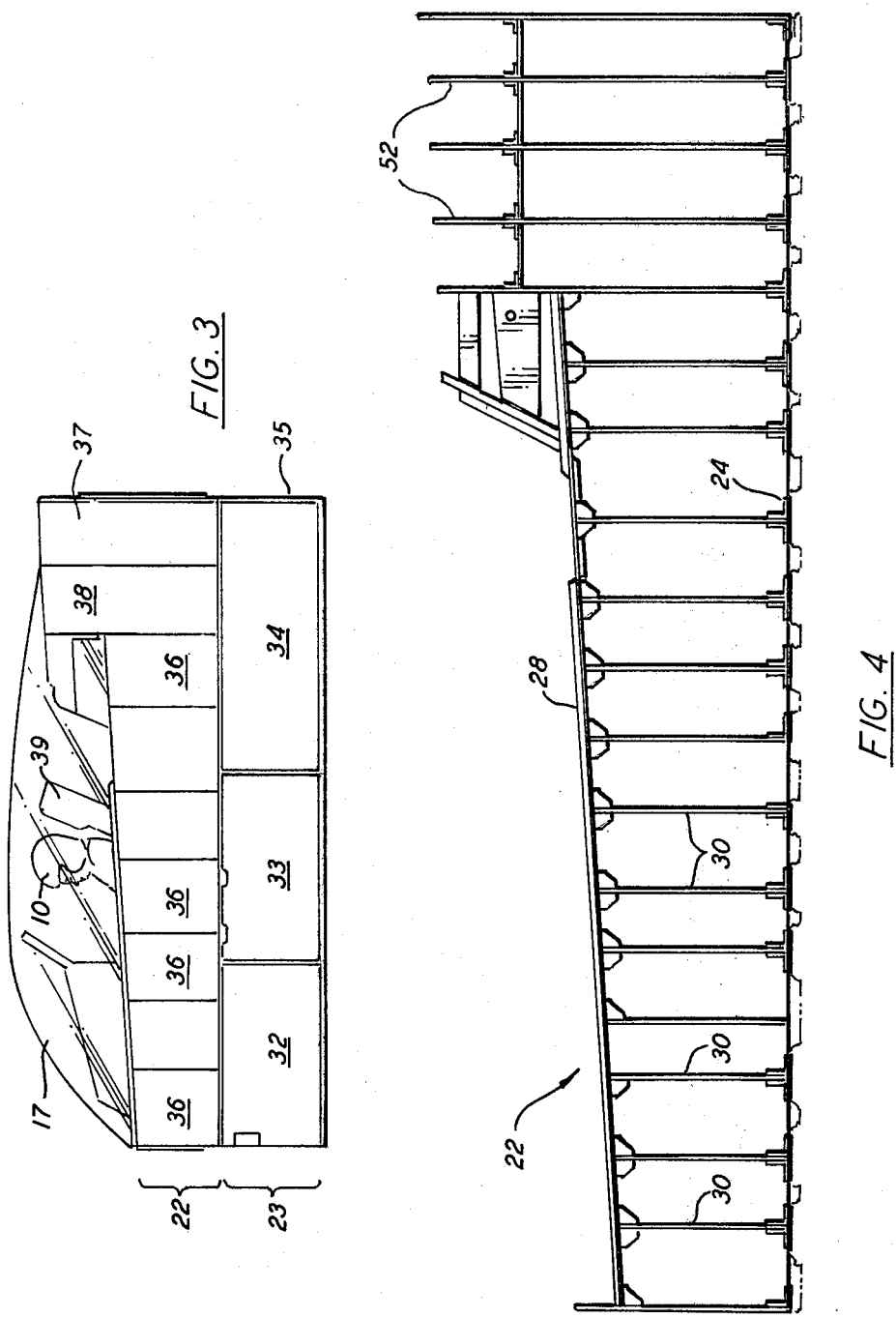

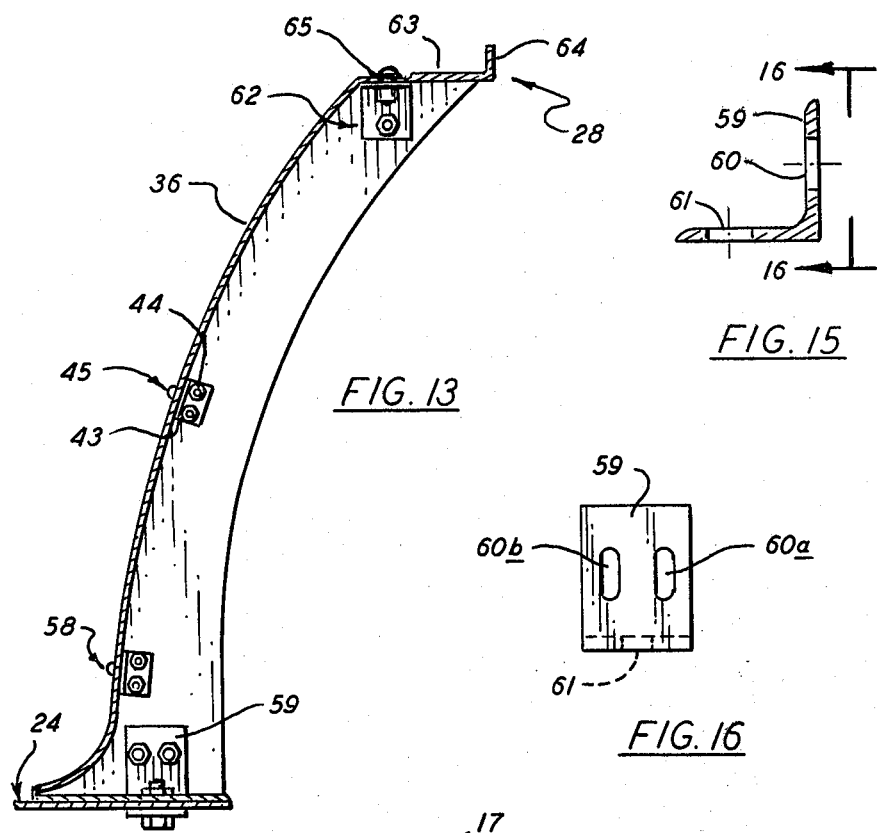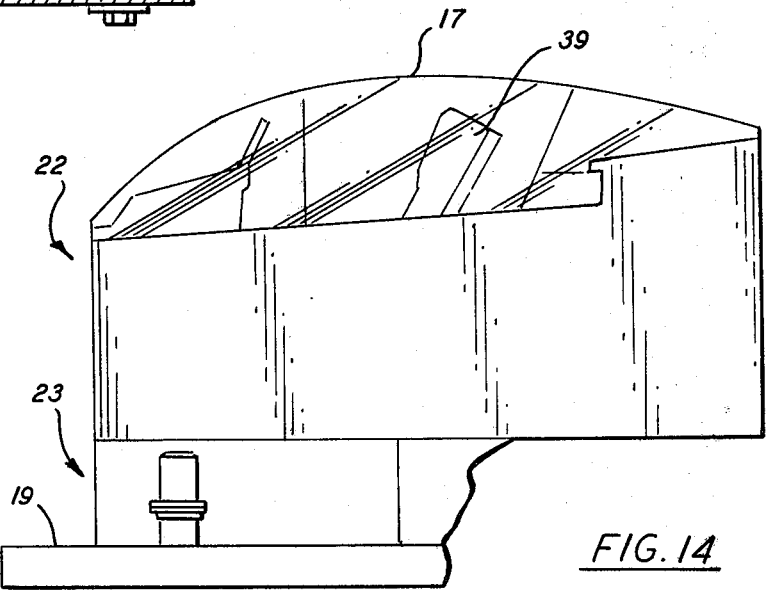

SIMULATOR STRUCTURE

The Government has rights in this invention pursuant to Contract No. F33657-77-C-0565 awarded by the Department of the Air Force.

BACKGROUND

The present invention, generally, relates to the field of simulators and, more particularly, to a new and improved strucutral arrangement for a vehicle simulator.

Due to recent advances in simulator technology, simulators are expected to supplant all in-flight training of pilots, and therefore, commercial pilots can expect to receive their Federal Licenses directly upon the completion of their flight training in simulators. Such simulator-trained commercial pilots, then, could carry paying passengers, even though they have never flow an actual aircraft before.

Both commercial and military pilots already use simulators for much of their training. However, commercial pilots today must log at least 1,500 hours of actual flying time in one type of plane or another. It is acknowledged by many today that most of the technical deficiencies in older simulators are overcome completely in the newer, present-day simulators. For example, the newer models of simulators can duplicate with startling realism day, night and dusk flying conditions, icy runways, wind problems and nearly every type of emergency imaginable.

Behind much of the additional realism achieved in the newer simulators today are several technical improvements: computers that are the brains of the simulators are faster and more sophisticated; computer-generated imagery on television screens is much sharper and much more versatile than old-style cameras that scanned maps; hydraulic-motion systems deliver better twists, tugs, bumps and jolts.

It is acknowledged also that the biggest advantage of training pilots by use of simulators, particularly the newer models of simulators, is that a simulator can create "unsafe" conditions, such as, for example, tire blowouts and engine failures, that cannot be duplicated in an actual aircraft during training without jeopardizing equipment and human life. It is acknowledged further that the training of a pilot on a simulator, particularly the newer, present-day simulators, turns out a much more proficient and experienced pilot.

While much attention has been given in recent times to the technical advancements in simulators, very little attention has been given to the structural details involved in a simulator apparatus in order to achieve a maximum of realism while overcoming other disadvantages. Heretofore, for example, when an aircraft was to be simulated, the cockpit from an actual model of the aircraft was used. Today, however, such duplication is prohibitive costwise.

Roughly 20 years ago, the efforts toward cost reduction produced some important results by fabricating the cockpit for an aircraft from molded fiberglass. The savings available due to that improvement overshadowed other disadvantages that have plagued the industry ever since, such as lack of accessibility, lack of fit of components and parts as on an actual aircraft (due to an inherent difficulty in maintaining close tolerances in fiberglass parts) and a difficulty in attaching parts, terminal connectors and the like to the thin fiberglass ribs.

SUMMARY OF THE INVENTION

Accordingly, a principal object of the present invention is to provide a new and improved structural arrangement for a simulator of a vehicle, such as a simulator of an aircraft.

Still another object of the invention is to provide a new and improved structure for a vehicle which will combine the features of greater economy in manufacture with greater accessibility of component parts during such manufacture, and later, for maintenance purposes.

According to the present invention, a vehicle simulator structure to achieve a maximum of realism for a trainee in the operator's position within the simulator will involve a first pair of spaced-apart sills extending horizontally and spaced above a base surface by a predetermined distance. Another pair of spaced-apart sills, extending substantially parallel to the first sills on the opposite side from the base by a precalculated distance, are supported by means of a second plurality of spaced-apart removable ribs, the outer edge of each being formed to substantially the same contour as each corresponding rib in the vehicle being simulated. The length of these second ribs is sufficient to space the second sills from the first mentioned sills by a distance precalculated to cover only the portion of the vehicle being simulated that is visible from the operator's position.

A first plurality of spaced-apart ribs support the first-mentioned sills above the base by a predetermined distance. A plurality of surface panels are formed to cover a predetermined number of ribs, some surface panels to be fixedly attached to ribs and some to be detachably attached, so that the panels which are detachable are removable for access to space within the simulator.

THE DRAWINGS

The foregoing, other and further objects, features and advantages of the present invention will appear more fully from the detailed description of the presently preferred embodiment of the invention and from the claims appended hereto, both viewed in conjunction with the accompanying drawings, in which:

FIG. 3 is a side view of a simulator structure in accordance with the invention showing the side panels in position and showing the cockpit cover and an outline of a pilot in the operator's position.

FIG. 4 is a side view drawn to double dimensions of the upper part only of the simulator structure shown in FIGS. 2 and 3, with all side panels removed to reveal the position of respective ribs.

FIG. 13 is a side view showing the contour of the curvature for one rib member and showing this rib member attached removably to the upper and the lower sills.

FIG. 14 is a side view, in elevation, of the structure shown in FIG. 3 and illustrating some of the simulator-related equipment affixed in place.

FIG. 15 is a side view, in cross-section, of an angle to attach, removably, the respective rib members shown in FIG. 4.

FIG. 16 is a view taken along the line 16—16 in FIG. 15.

DETAILED DESCRIPTION

Figure 1:
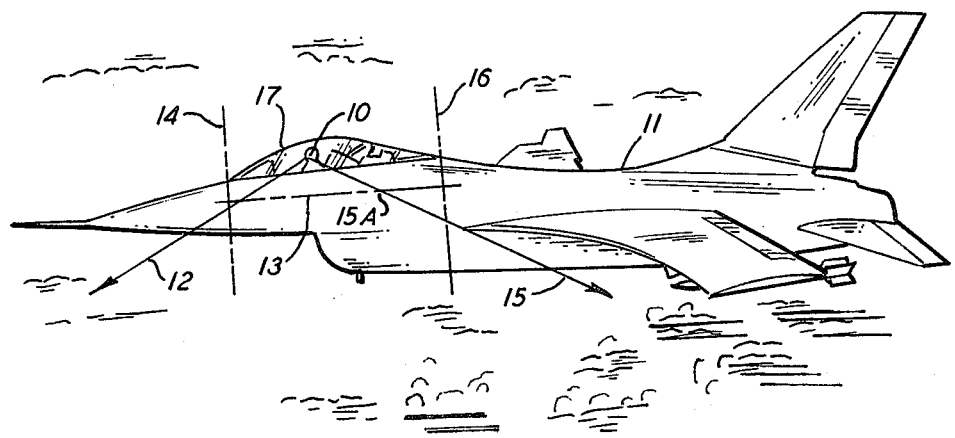
FIG. 1 is an outline of an aircraft as a particular vehicle for which a simulator is to be constructed in accordance with the principles of the present invention.

While the principles of the present invention may be utilized to manufacture a simulator of any desired vehicle, the particular vehicle selected for the purposes of this illustration is an aircraft as shown in the drawings.

Referring now to FIG. 1 of the drawings, that portion of an actual vehicle selected for the purposes of fabricating a simulator are those portions of the vehicle which are visible to a trainee sitting in the operator's position. For example, in FIG. 1, a pilot, indicated by the reference numeral 10, is shown in an aircraft 11.

From an operator's position, a pilot 10 looking forward and tilting his head slightly to his left and downwardly, can view that outside portion of his aircraft 11 as seen along the line 12. However, due to the curvature of the aircraft 11 around and underneath the aircraft, a pilot 10 may see the side of his aircraft only to a line substantially indicated by the line 13.

Accordingly, the forward-most part of a simulator of this aircraft 11 need only be to a line 14, indicated in FIG. 1 as being a vertical line drawn through the intersection of lines 12 and 13. However, glancing over his left shoulder and downwardly, a pilot 10 may see along a line indicated by the numeral 15, and an intersection between the line 13 and the line 15 is a point 15A, which is substantially forward of a vertical line 16.

For the purposes of the simulator, the canopy 17 is hinged across the back exactly as it is in the actual aircraft. Therefore, the vertical line 16 is moved back (to the right as viewed in FIG. 1) just past the hinge for the canopy 17.

Figure 2:
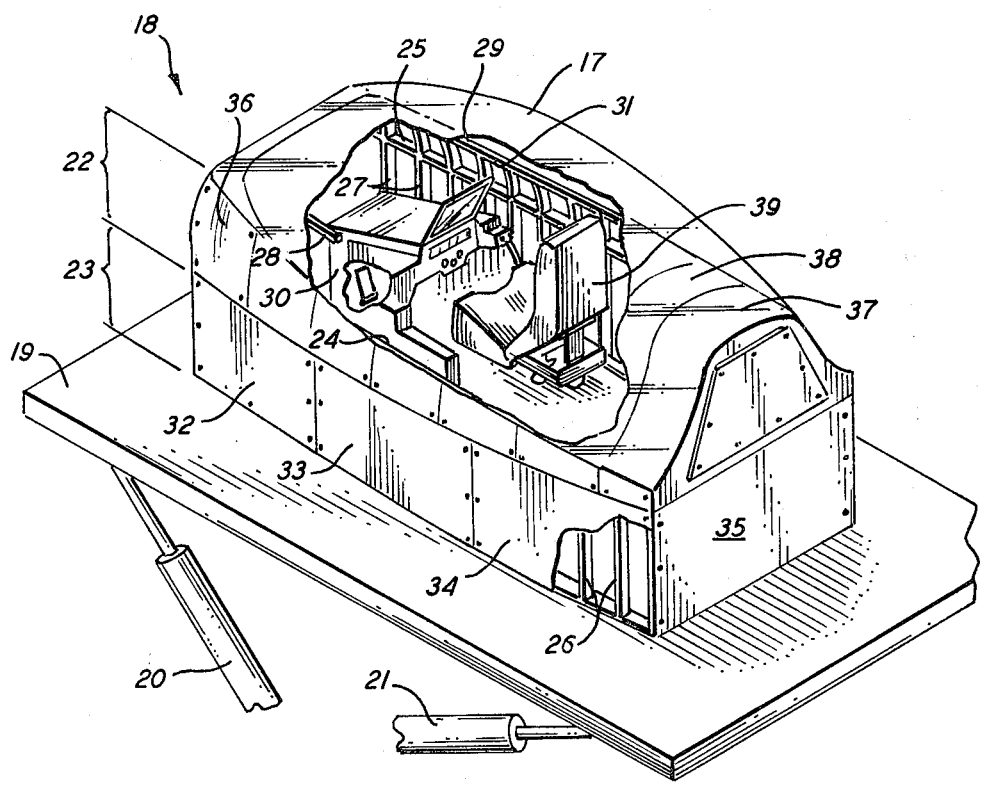
FIG. 2 is a simulator structure in perspective with some sections shown in a cut-away view in order to illustrate some of the inner structural details.

Referring now to FIG. 2 of the drawings, a simulator indicated generally by the reference numeral 18 is characterized by a platform 19, which can be stationary, or it can be movable, as indicated by the hydraulic cylinders 20 and 21. The simulator 18 is characterized further by a structure manufactured directly on the base 19 and consisting essentially of an upper part 22 and a lower part 23.

The upper part 22 of the simulator 18 is contoured like that portion of the actual aircraft 11 which a pilot 10 can view when looking out his window from the operator's position, described above. In contrast, the lower part 23 is that part of the actual aircraft below the line 13, in FIG. 1, and since it is not visible to a pilot 10 from the operator's position, factors other than visual faithfulness to the actual aircraft's contour will dictate its dimensions, such as the volume required to enclose simulator-related components, economy in manufacture and physical support for the upper part 22.

Accordingly, a first rule for a simulator structure, which is important to achieve the purposes of the present invention, is that the contour of only that outside portion visible from the operator's position within the simulator is substantially the same as the contour of the corresponding outside portion on the actual vehicle being simulated.

Additional features in accordance with the structure of the invention include two spaced-apart sills 24 and 25 which are supported above the base 19 by a plurality of ribs 26 and 27, respectively. The respective sills 24 and 25 are spaced apart a distance substantially equal to the width of the aircraft at the horizontal line 13, FIG. 1.

A second pair of sills 28 and 29 are supported above the two spaced-apart sills 24 and 25 by a plurality of ribs 30 and 31, the outer edge of which match the contour configuration of the aircraft 11 above the line 13 in FIG. 1. The two sills 28 and 29 are spaced apart relative to each other by a distance equal to that found in the cockpit where the pilot 10 sits in the aircraft 11 and will be described in more detail presently.

The first-mentioned plurality of ribs 26 (on one side of the simulator 18) and 27 (on the opposite side) are spaced apart relative to each other by any desired amount. On the other hand, the second-mentioned plurality of ribs 30 and 31 must be spaced apart, in accordance with the invention, by a distance which substantially matches the spacing between corresponding ribs in the actual vehicle being simulated.

While the first-mentioned plurality of spaced-apart ribs 26 and 27 may be any desired configuration, since this contour is not visible from the operating position of the aircraft, these ribs are substantially straight and are perpendicular to the base 19 in this form of the invention. Accordingly, the panels, indicated generally by the referenced numerals 32, 33 and 34, corresponding panels on the opposite side of the simulator 18, the front panel (not visible) which corresponds to the rear panel 35, are all substantially rectangular in configuration to cover several of these spaced-apart ribs 26 and 27.

In contrast, the reference numeral 36 identifies all of the panels covering the second-mentioned plurality of ribs 30 and 31, those which have their outer edges contoured to the same configuration as corresponding ribs in the aircraft 11, as seen above the line 13 from the operating position by the pilot 10. Each of the panels 36, therefore, is formed to a different contour, and is illustrated best in FIG. 6 of the drawings.

There are two panels across the top rear of the simulator 18, and these are identified by the reference numerals 37 and 38. These curved panels 37 and 38 are fixedly attached in the position shown by rivets, which will be described in more detailed presently.

Other components are visible through the cut-away portion of this FIG. 2, but these components form no part of the present invention. They are included here only for the purpose of orientation for the simulator. As an example, the clear canopy 17 and the operator's position, indicated by a seat 39, are shown to illustrate the relative positions in the simulator.

Figure 6:
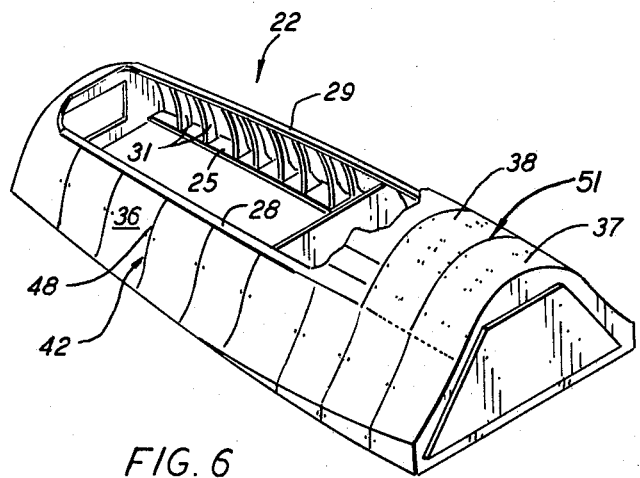
FIG. 6 is the upper part of FIG. 3 shown in perspective with portions cut away to reveal some of the internal details.

While FIG. 3 is drawn to the same scale as FIGS. 2 and 6, FIG. 4 is drawn to twice this scale in order to illustrate the ribs, their spacing and their respective attaching means with greater detail. FIG. 4 relates to FIG. 3 as being not only double the scale, but showing only the upper part 22 of the simulator 18.

Figure 5:
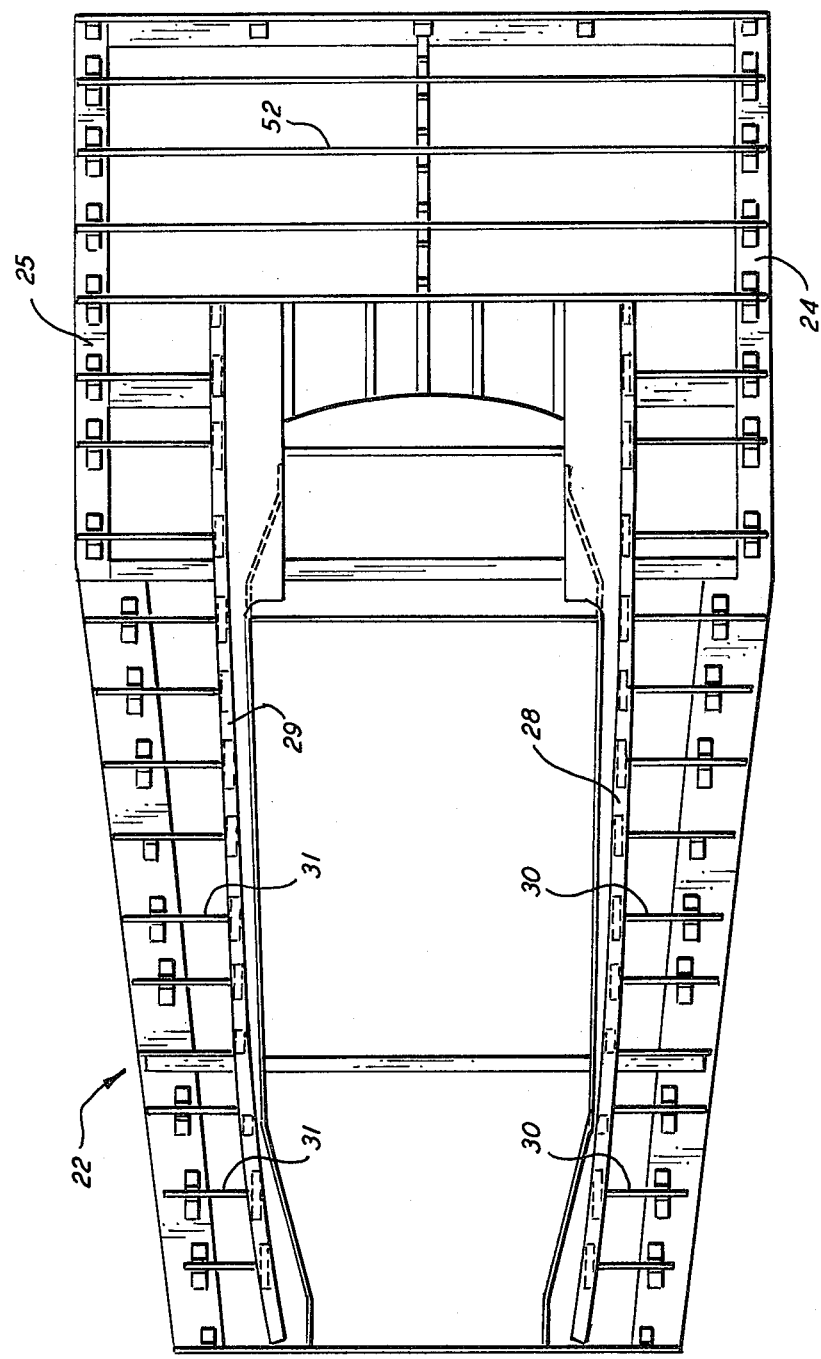
FIG. 5 is a top view of FIG. 4.

Referring now more particularly to FIGS. 4 and 5 of the drawings, the structural details of the rib arrangement for the simulator 18 can be seen from the side and the top views, respectively. As pointed out previously above but repeated now for emphasis, the outermost edge of each of these ribs 30 and 31, that extend only from the respective lower sills 24 and 25 to the upper sills 28 and 29, are contoured substantially to the identical configuration of the actual vehicle being simulated in order to achieve maximum realism.

In the particular simulator being described and illustrated, each of these ribs 30 and 31 are made to the same thickness of each rib in the actual vehicle being simulated. In addition, the spacing between respective ribs along each side of the simulator structure is as nearly identical as practicable with that found in the actual vehicle also. An important reason for this spacing is that much equipment, components, terminals, and other electrical connections are fitted between and affixed to these ribs to anchor each in place securely.

While much of the component parts associated with the simulator operation are affixed within the lowermost part 23, FIG. 3, behind the panels 32, 33, and 34, it is important to have those components necessary for operating the simulator, which are found also in the actual vehicle, to be located as nearly as possible in the identical position in the simulator as they are in the actual vehicle, so that other training may be realized also, such as maintenance procedures, etc.

It must be appreciated that simulators of the type of vehicle being illustrated here are customarily in substantially continuous use 24 hours a day, and therefore, there is a luxury in the maintenance area of activity that is permitted in this simulator function which is not available in the actual vehicle. Such a luxury is that each of these ribs 30 and 31 are removable, selectively, in accordance with the invention, to permit access to equipment and other components located within the space behind the ribs. While this feature departs from the faithfulness of the simulator structure to the vehicle being simulated, it permits a substantial reduction in "down time" for the simulator.

Figure 7:
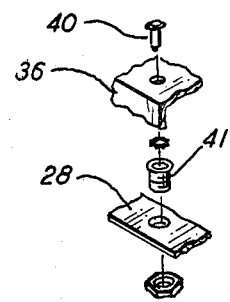
FIG. 7 is an exploded view showing one detachable connection device for connecting the upper edges of side panels.
Figure 8:
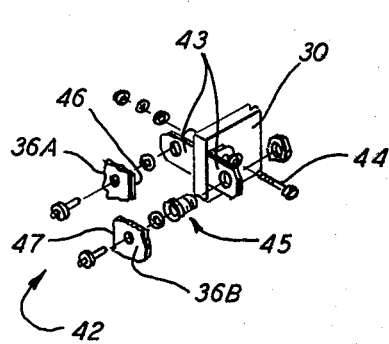
FIG. 8 is an exploded view showing connections for attaching angles to a rib and for detachably connecting adjacent side surface panel members of FIG. 6.
Figure 9:
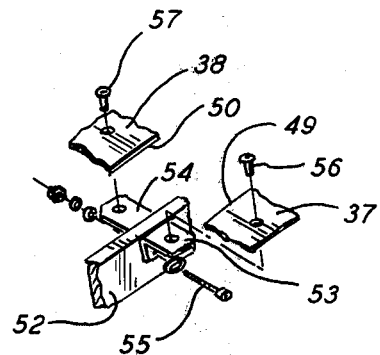
FIG. 9 is an exploded view of a more permanent connection for the panels that are not readily removable.

FIGS. 7, 8, and 9 illustrate various attaching arrangements that have een selected for attaching the panels 36, 37 and 38 at various points. For example, in FIG. 7, there is illustrated a way of attaching each of the curved side panels 36 along the uppermost edge of each panel, preferably only at the corners, to the upper sill 28. This is done by using a quarter-turn, quick disconnect fastener, such as is available commercially, and is illustrated by the removable part 40 from the socket 41. The use of this type of attachment is well known, and further explanation is not believed to be indicated.

To attach each of these curved side panels 36 at their mid-points, indicated by the reference numeral 42 in FIG. 6 and FIG. 8, a rib 30 has affixed thereto two angles 43, as shown in FIG. 8 particularly, by means of a single threaded bolt 44. To each of these angles 43, there is affixed one of these quarter-turn quick-disconnect fasteners, illustrated by the reference numeral 45 but which is similar to that illustrated in FIG. 7 by the reference numerals 40 and 41.

The arrangement illustrated in FIG. 8 is used to attach two adjacent panels 36A and 36B whereby the edges of 46 and 47 on the respective panels are tightly positioned together to form the line 48, in FIG. 6. Of course, either one of the angles 43 may be omitted from a particular rib 30 where it is not appropriate, such as on the forwardmost rib and the rearmost rib.

In FIG. 9 of the drawings, a way is illustrated for attaching any of the panels which need not be removable; for example, the panels 37 and 38, FIG. 6. In this view, the edges 49 and 50 of the panels 37 and 38, respectively, are placed immediately adjacent each other to form the line 51 in FIG. 6.

To a cross rib 52, in FIGS. 4 and 9, two angles 53 and 54 are attached by means of a threaded bolt 55, which is similar to, or the same as, the bolt 44 in FIG. 8. However, to each of these angles 53 and 54, the panels 37 and 38 are attached by means of rivets 56 and 57.

Referring now to FIG. 13 of the drawings, the panel 36 is illustrated attached to the rib 30, as described above, at the mid-point by a quarter-turn quick-disconnect fastener 45 affixed to an angle 43 by one or more threaded bolts 44. The identical fastener can be used to attach the panel 36 along a lower edge, as indicated by the reference numeral 58, if desired.

Figure 10:
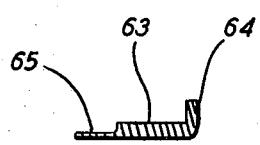
FIG. 10 is a view taken along the 10—10 in FIG. 11.

However, the upper end of the panel 36 is bent sharply to fit over a recessed edge 65 on the upper sill 28, as shown in FIG. 10 and FIG. 13. It is attached along this sill 28 as described in connection with FIG. 7 hereinabove, and the arrangement for the upper sills will be described in more detail hereinafter.

A suitable pliable material (not shown) is fitted onto the upper surface of the upper sills 28 and 29 in order to cushion and to provide a seal between the sills and the canopy 17 when it is closed.

Returning to a description of how each of the ribs 30 and 31 is removable, or detachable, the lower end of each of these ribs is attached by means of an angle 59, shown better in more detail in FIGS. 15 and 16. Each end of the angle 59 has one or more holes 60 and 61, FIG. 15, which are either oversized or elongated.

As best seen in FIG. 16, the upright part of the angle 59 has the holes 60a and 60b which are elongated, in contrast with the hole 61 in the horizontal part of the angle 59 which is oversized. If elongated holes are used, the holes 60a and 60b are elongated in one direction and the holes in the ribs are elongated at 90° to the holes 60a and 60b in order to permit a maximum of flexibility in making adjustments in position.

In contrast, if oversized holes are used, the oversized hole will be substantially the same oversized dimension in both parts to be affixed by the angle 59. The term "oversized" refers to the diameter of the bolt to pass through the hole, the hole being over the size of the bolt by a predetermined amount, and a washer of enlarged circumference would be fitted beneath the head of such a bolt, as well as beneath the nut threaded on the opposite end, to ensure a tight fitting relationship.

The upper end of the rib 30 is secured to the upper sill 28 by means of a similar angle, indicated generally by the reference numeral 62, and can be similar to that just described in connection with FIGS. 15 and 16.

Figure 11:
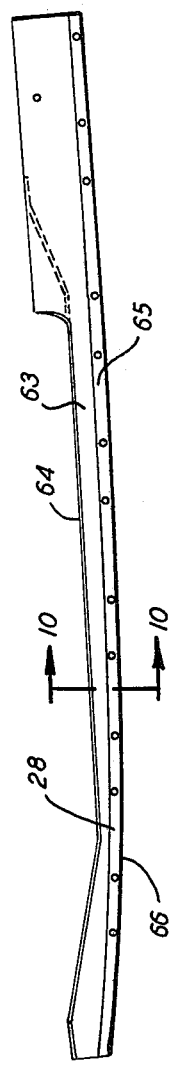
FIG. 11 is a top view of one of the upper sills.

Referring more particularly to FIG. 10 of the drawings, which shows in cross-section a view of the upper sill 29 taken along the line 10—10 in FIG. 11, it reveals a horizontal part 63 and a vertical part 64. A recessed edge 65 extend along the entire length of the upper sill 28 and is to a depth to receive the surface panel 36 along its upper edge, as best seen in FIG. 13.

Figure 12:
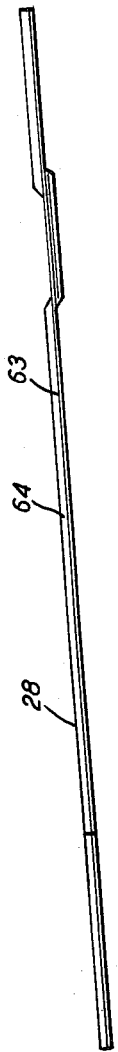
FIG. 12 is a side view of the sill shown in FIG. 11.

As better seen in FIGS. 11 and 12, the uper sill 28 has its outer edge 66 formed with a constantly changing radius which, however, matches very closely that of the actual aircraft.

Referring now to FIG. 14, a simulator structure is illustrated showing both the upper part 22 and the lower portion 23, a part of which is cut away as well as the base 19. In accordance with one of the principles of the invention, the inside of the cockpit, i.e., all that is covered by the canopy 17, is identical with that of the actual aircraft 11. The operator's position, indicated by the seat 39, is not only the exact seat of the actual aircraft 11, but it is tilted to be positioned as it is in such aircraft. Not only the interior, that portion covered by the canopy 17, but as much of the exterior that is visible to a trainee in the operator's position is identical with that of the actual aircraft.

Also seen in FIG. 14 are some of the components positioned within the simulator structure, but these form no part of the present invention, which is a structure to position such components in, as nearly as possible, the exact position that they are within the actual aircraft 11.

In view of the above detailed description of the presently preferred form of the invention, other and further modifications, variations, advantages and uses will occur to one skilled in this art. Accordingly, the description as presented hereinabove is to be considered as illustrative only, the true spirit and scope of the inention being that defined by the claims appended hereto.

I claim:

1. A vehicle simulator structure to present a maximum of realism for a trainee in the operator's position within the simulator, said vehicle simulator being of a type in which said trainee in the operator's position can see at least a portion of the external surface of the vehicle being simulated, said simulator structure comprising:

a planar surface to function as the simulator base, a first pair of spaced-apart sill members extending horizontally and spaced from said planar surface a predetermined distance to define space to enclose simulator-related components, a second pair of spaced-apart sill members extending substantially parallel to said first sill members on the opposite side furthermost from said planar surface and spaced from said first sill members by a distance precalculated to cover only the portion of the vehicle being simulated that is visible from the operator's position, the length of said simulator structure is co-extensive with the length of said first and second pairs of sill members, which length is limited to only as far forward and at least as far rearward from the operator's position on the vehicle being simulated that is visible from the operator's position, a first plurality of spaced-apart rib members extending between said planar surface and said first sill members to fixedly support said first sill members at said predetermined distance from said planar surface, a second plurality of spaced-apart rib members extending between said first and said second sill members, each rib member in said second plurality being removable selectively, the outer edge of said second plurality of rib members being formed to substantially the same contours as the corresponding ribs in a vehicle being simulated and the length of these second plurality of rib members being sufficient to space said second sill members from said first sill members by said precalculated distance, said second plurality of rib members being spaced apart from each other a distance substantially the same as the corresponding ribs in a vehicle being simulated, the thickness of each one of said second plurality of rib members is sufficient to provide strength to support at least the same component supported by the corresponding rib members in the vehicle being simulated, a plurality of surface panel members preformed to cover predetermined rib members, a plurality of means to fixedly attach preselected surface panel members in position, and means to detachably attach the panel members not selected for fixedly attaching in position, so that the panel members which are detachably attached are removable for access to the space within the simulator.

2. The vehicle simulator structure as set forth in claim 1 wherein the vehicle being simulated is an aircraft and said operator's position is a seat for a pilot.

* * * * *